United States Patent [19]
Payne et al.

[11] Patent Number: 5,150,602
[45] Date of Patent: Sep. 29, 1992

[54] CRIMPING METHOD FOR ELECTROCHEMICAL CELLS

[75] Inventors: Robert J. Payne, Wellesley, Mass.; Robert A. Yoppolo, Woonsocket, R.I.

[73] Assignee: Duracell Inc., Bethel, Conn.

[21] Appl. No.: 580,069

[22] Filed: Sep. 10, 1990

[51] Int. Cl.⁵ .............................................. H01M 2/04
[52] U.S. Cl. ..................... 29/623.2; 29/422; 29/515
[58] Field of Search ............... 29/623.2, 422, 515, 29/731

[56] References Cited

U.S. PATENT DOCUMENTS

| | | | |
|---|---|---|---|
| 3,859,141 | 1/1975 | Strauss et al. | 29/623.2 |
| 4,063,902 | 12/1977 | Heinz | 29/623.2 |
| 4,136,438 | 1/1979 | Mallory | 29/623.2 |
| 4,442,184 | 4/1984 | Spanur | 29/623.2 |
| 4,532,705 | 8/1985 | Zupanck et al. | 29/623.2 |
| 4,656,736 | 4/1987 | Volkhin et al. | 29/623.2 |

FOREIGN PATENT DOCUMENTS

| | | | |
|---|---|---|---|
| 574790 | 9/1977 | U.S.S.R. | 29/623.2 |

Primary Examiner—Stephen Kalafut
Attorney, Agent, or Firm—Ronald S. Cornell; James B. McVeigh, Jr.

[57] ABSTRACT

An improved method for sealing an electrochemical cell comprises applying radial forces to an expanded, upper portion of the cell casing. A resilient sealing member is located in the upper portion so that when the radial forces reduce the diameter of the expanded casing portion the sealing member is compressingly held in place.

12 Claims, 3 Drawing Sheets

CRIMPING METHOD FOR ELECTROCHEMICAL CELLS

This invention relates to an improved method for crimp-sealing electrochemical cells. In particular, the method comprises pre-crimping the cell by bending the upper end of the cell wall inwardly followed by applying radial forces around the circumference of the cell casing in order to reduce the diameter thereof and hold the sealing member in place.

The long shelf life of both alkaline and lithium batteries mandates that these batteries be provided with a tight seal so that electrolyte leakage is prevented over the long life of the product. The trend towards zero mercury content in alkaline cells means that these cells must be designed to withhold higher internal hydrogen gas pressures. The radial crimping method of the present invention provides a leak-tight seal demanded by today's commercial batteries.

A single-step crimping method using radial forces is disclosed in U.S. Pat. No. 3,069,489. A disadvantage of a single step method is that it takes high forces (i.e. energy input) to form the crimp in one step and the application of those forces can deform the casing. Additionally, only a marginal degree of roll over of the upper edge of the casing is possible. A high degree of roll-over is desirable because it enhances the ability of the seal to withstand high internal pressures without being dislodged.

Radial crimping is characterized by the application of an inwardly directed radial force uniformly around the circumference of the casing being sealed. This force is opposed by a resilient, sealing member which is placed in the opening being sealed. A preferred sealing member is disclosed in co-pending application Ser. No. 07/447,309 filed Dec. 7, 1989. The sealing member comprises a circular metal support and a plastic grommet. The grommet has an upwardly extending wall which circumscribes the outer edge of the support. Radially crimping the sealing member in the open end of a cell casing reduces the diameter of the resilient sealing member and compresses the grommet wall between the metal support and the inwardly crimped casing wall. The compressed wall prevents leakage from occuring between the metal support and the casing. Such a radial method of crimping reduces the overall crimping force and eliminates problems associated with crimping methods which apply an axial force such as wall bulging, bottom dimpling, and wrinkling of the casing rim.

The present invention is a multistep process for radially crimping a cell while also forming a high degree of roll-over of the cell casing rim. The sum of the forces needed to effectuate each step is less than the total force needed if a single step method was used. The result is less tool wear and no deformation of the casing.

These, and other features and objects of the invention are, however, more fully described below in association with the accompanying drawings, in which.

Figure 1:
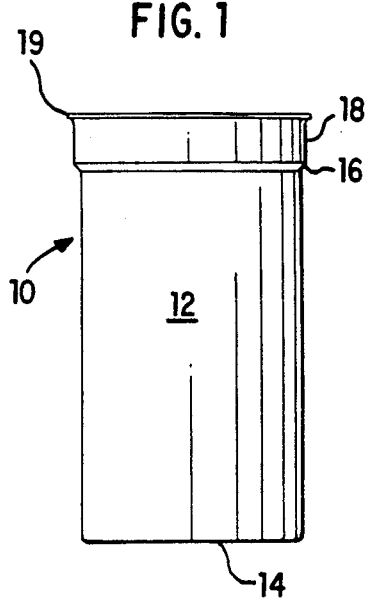
FIG. 1 shows a side view of a cell casing.

In accordance with the present invention, a method for radially crimping an electrochemical cell comprises forming an outwardly-directed, circumferential step in the cell casing wall nearest the open end. Referring now to the drawings, FIG. 1 shows a side view of a cylindrical casing 10. Casing 10 has a cylindrical wall 12, a bottom 14, an outwardly directed step 16, an expanded upper wall 18, and upper rim 19. Casing 10 is preferably formed using a deep drawing method on appropriate sheet stock material. Alternatively, casing 10 can be formed having a uniform cylindrical wall and step 16 and expanded portion 18 can be formed in a subsequent operation. The location of step 16, and in turn the height of expanded wall portion 18, is determined by the thickness of the sealing member to be used and the shape of the peripheral portion of the sealing member. As discussed below, wall portion 18 is folded inwardly over the peripheral portion of the sealing member so that wall 18 must be high enough to accomplish this result.

Figure 2:
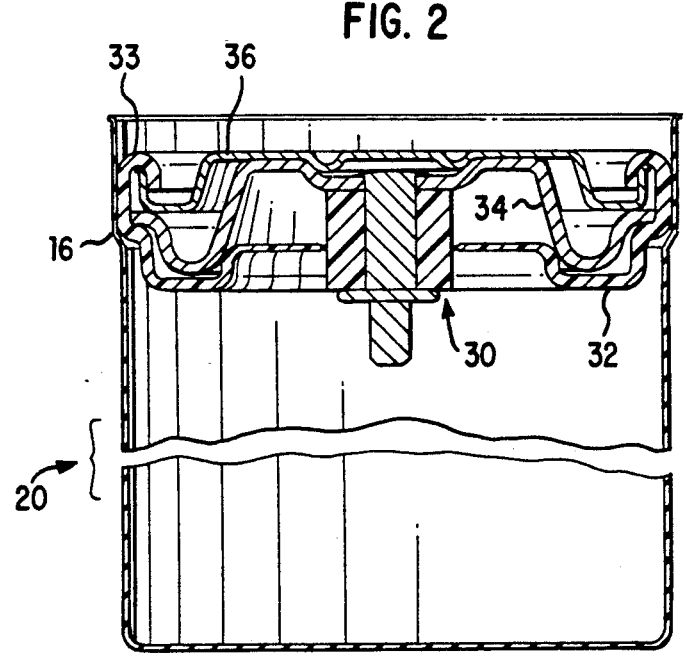
FIG. 2 shows a cross-sectional view through an electrochemical cell with the seal member in place before the crimping process.

FIG. 2 shows a cross-sectional view through an electrochemical cell 20 having a resilient seal member 30 seated in place on step 16. Seal member 30 comprises plastic grommet 32, metal support 34, and metal end cap 36. The specific details regarding these components are disclosed in co-pending application Ser. No. 447,309 and said disclosure is incorporated herein by reference. The member has a diameter which is about the same as, or slightly less than, the diameter of the expanded portion of the casing wall. While the remaining discussion pertains to the seal member shown, other seal member designs would be suitable for use with the present invention. Those features of the seal member which are desirable for use with the present invention are noted throughout the following description.

Figure 3:
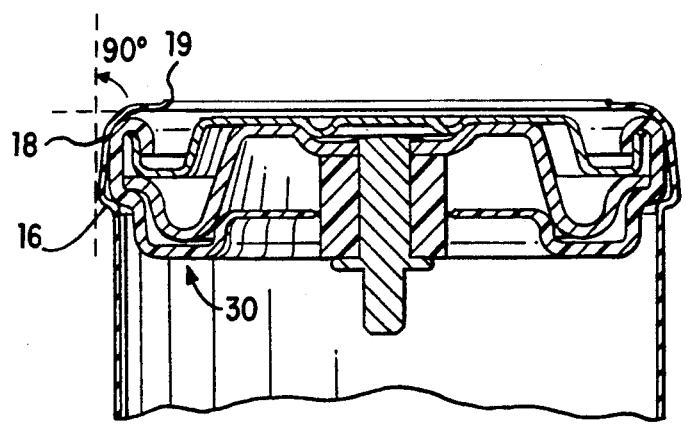
FIG. 3 shows a cross-sectional view through an electrochemical cell after the first crimping step.

Cell 20 is pre-crimped once seal member 30 is in place. Pre-crimping involves bending rim 19 and expanded wall portion 18 inwardly, to an angle of no more than 90° from the starting position (see FIG. 3), over the peripheral portion of the sealing member. It is preferred that seal member 30 has a circumferential, upwardly extending rib portion 33 over which upper wall 18 can be folded so as to compress said rib between the folded container edge and the container wall. The act of folding upper wall 18 inwardly over said rib also serves to hold seal member 30 downwardly against step 16.

Figure 4:
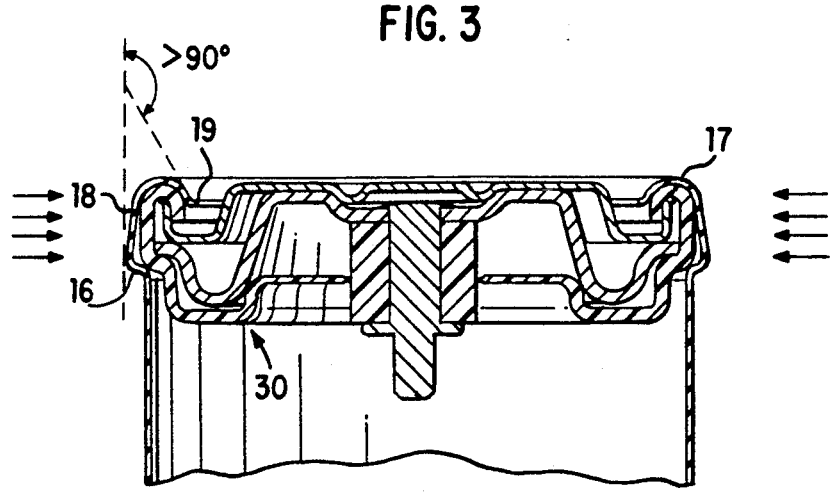
FIG. 4 shows a cross-sectional view through an electrochemical cell after the second crimping step.

A second bending step is carried out which further bends the rim 19 inwardly to an angle greater than 90° from the starting position as shown in FIG. 4. Thus, the upper rim of the sealed cell is comprised of bend 17 which is made in the expanded wall portion 18 by the preceding steps. The height of the sealed cell is determined by where bend 17 is made in expanded wall portion 18. By effectuating the bend in two steps the force applied in any one of the steps is less than the force which would be needed to form the bend in a single step.

Figure 5:
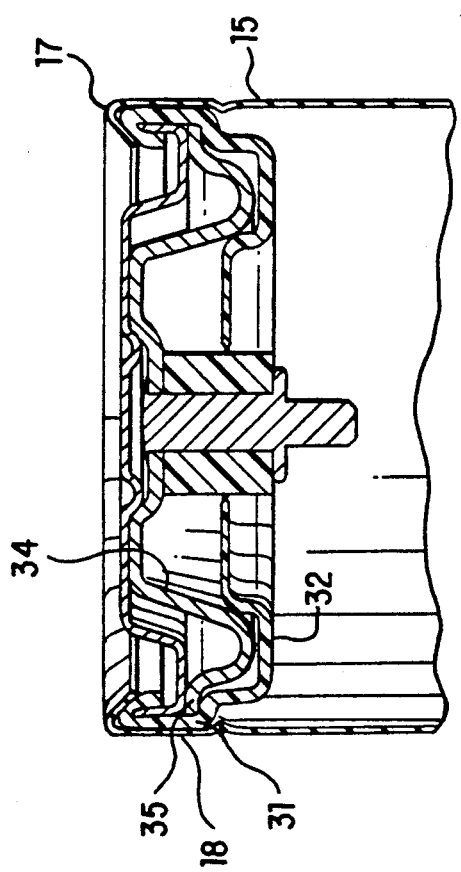
FIG. 5 shows a cross-sectional view through an electrochemical cell after the final crimping step.

The crimp seal is completed by applying inwardly directed radial forces (shown as arrows in FIG. 4) against expanded portion 18 so that it is reduced to the same diameter as the lower portion of the cell casing (see FIG. 5). A procedure for applying said radial forces is discussed more fully below. The outer wall 31 (FIG. 5) of plastic grommet 32 is compressed between casing wall 18 and the outer edge 35 of metal support 34. Sealing member 30 must have some resilience so that it can accommodate a reduction in its diameter. As described in co-pending application Ser. No. 447,309 it is preferred that metal support 34 comprises a spring means which is place under compression by the radial crimp. Thus, the metal support edge 35 is pushed outwardly by the spring means so that grommet wall 31 remains compressed even during extreme temperature fluctuations. It is clear that any seal member for use with the present crimping method must be capable of having its diameter reduced without any detrimental distortions. Even though the diameter of expanded portion 18 is reduced there is an inwardly directed annular step 15 (an artifact of step 16) which remains and which supports the sealing member and holds it in place.

It is preferred that the radial force is first applied to the upper portion of casing wall 18 and then is gradually applied downwardly toward the portion where step 16 is located. This sequence of applying the radial force causes bend 17 (as shown in FIG. 5) to be more angular than it was after the second bending operation (as shown in FIG. 4). Such an angular profile of bend 17 is desirable because it both squeezes circumferential rib 33 of seal member 30, providing additional sealing area, and it provides a stronger, downward hold of seal member 30 onto step 16. Thus, a secondary sealing area is created in addition to the primary sealing area at the edge 35 of metal support 34 and a better ability to withstand decrimping is achieved.

It is possible to reverse the sequence of the second bending step and the radial crimping step. Thus, the cell shown in FIG. 3 could first have radial forces applied to expanded wall portion 18 followed by the second bending step which would complete the greater than 90° bend in expanded wall portion 18. This will be discussed further below in the discussion of tooling designs.

Figure 6A:
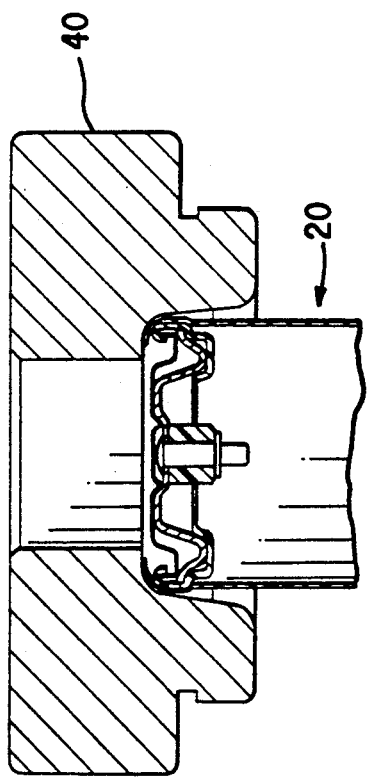
FIG. 6A shows a cross-sectional view of the tooling die shown in FIG. 6 engaged with a cell after completeing the first crimping step.
Figure 6:
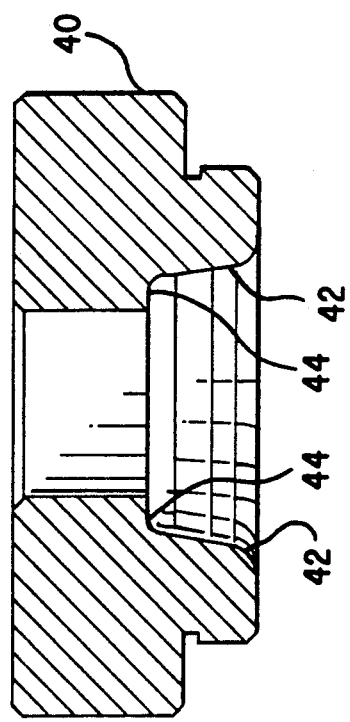
FIG. 6 shows a cross-sectional view through a tooling die for use in the first crimping step.

A variety of tooling designs are possible which will accomplish the crimping method of the present invention. The following discussion is not intended to limit the present invention to using only the tooling described but is intended as being illustrative of one method for effecting the present invention. FIG. 6 shows a cross-sectional view through metal die 40, said die being designed to make the 90° bend in expanded wall portion 18. Die 40 has a cavity formed therein having inwardly tapered wall 42 terminating in a right-angled portion 44. A lower die nest (not shown) is used to hold the cell during the precrimping step. Pre-crimping is effectuated by driving die 40 downwardly onto cell 20 with sufficient force so that upper casing wall 18 is folded inwardly, first by tapered wall 42 and then by right angled portion 44 as shown in FIG. 6A. This results in the pre-crimped cell shown in FIG. 3. Minimal radially compressive forces are applied in this operation. Rather, the force applied is primarily directed to shaping rim 19 of casing 10 and prepositioning it for the final crimping sequence. It has been discovered that the fold-over angle made during pre-crimping should not be greater than 90° from the start position since the force required to do this in a single step increases exponentially. The application of such force in a single step increases the probability of damage to the cell casing during the operation.

Figure 7B:
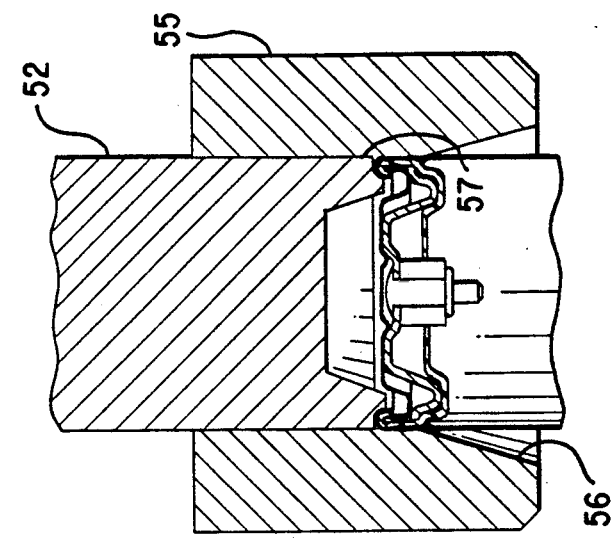
FIG. 7B shows a cross-sectional view of the tooling die shown in FIG. 7 engaged with a cell after completing the third crimping step.
Figure 7A:
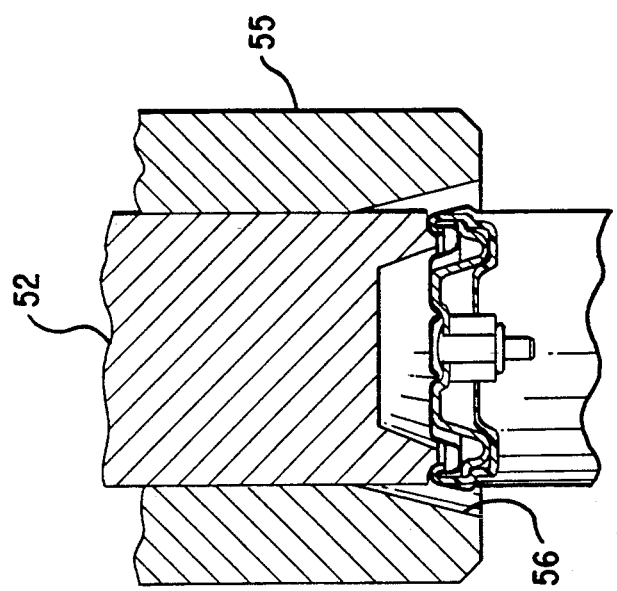
FIG. 7A shows a cross-sectional view of the tooling die shown in FIG. 7 engaged with a cell after completing the second crimping step.
Figure 7:
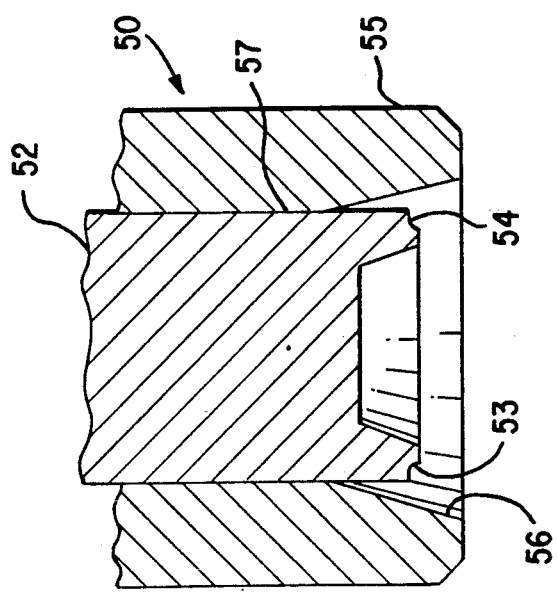
FIG. 7 shows a cross-sectional view of a tooling die for use in the second and third crimping steps.

FIG. 7 shows a cross-sectional view through a single die 50 designed to complete the second bending step and the radial crimping step. Die 50 comprises center punch 52 and sizing die 55 which are capable of independent movement. Center punch 52 comprises an inner, annular lip portion 53 and an outer shoulder portion 54. Sizing die 50 comprises a cavity defined by inwardly tapered wall 56 and cylindrical wall 57. A precrimped cell (such as shown in FIG. 4) is placed beneath the die. Punch 52 and die 55 operate in two separate motions in a synchronous fashion to provide the desired radial crimp and subsequent cell ejection from the die. The final crimping sequence using die 50 is as follows. Die 55 and punch 52 initially travel downwardly together until lip portion 53 engages rim 19 of pre-crimped cell 20. At this point center punch 52 shapes lip 19 which is folded downwardly following the contour of shoulder 54 as shown in FIG. 7A. Center punch 52 travels to a fixed stop position so that the height of the final crimped cell is accurately controlled.

Center punch 52 remains in the position shown in FIG. 7A and firmly holds the cell during the next operation. Sizing die 55 continues to be driven downwardly once center punch 52 stops. The downward movement of tapered wall 56 causes a radial force to be applied on expanded wall portion 18 whereby the diameter is reduced as die 55 travels down. Tapered wall 56 causes the radial force to first be applied near the top of the cell followed by a downward application of the radial force as die 55 moves downwardly. As discussed above, this sequence of applying the radial force results in the angular profile of bend 17 as shown in FIG. 5. Sizing die 55 travels downwardly just beyond the point where the radial seal is made so that cylindrical wall 57 smooths wall portion 18. Upon reaching its lowest point of travel, sizing die 55 retracts while center punch 52 remains stationary and holds the crimped cell down. This action allows the cell to resist the upward movement of sizing die 55 and "strips" cell 20 from within sizing die 55. After sizing die 55 has cleared the top of cell 20, center punch 52 is retracted and the crimped cell 20 is free from the tooling. This sequence of movements eliminates the need of removing cell 20 from die 55 by applying a force to the sealing member to dislodge the cell from the die. Any force which is applied to the sealing member after crimping can not only damage the sealing member but may also disturb the seal between the member and the casing.

It is, of course, necessary to center cell 20 beneath die 50 before the second bending step and final crimping step occur. There are a number of ways by which this can be achieved. One way (not shown) is to provide a cylindrical wall attached to tapered wall 56 just below the point where wall 56 has a diameter which serves to crimp the cell. This cylindrical wall portion would have a diameter about the same as the precrimped cell so that the cylindrical wall portion would center cell 20 within 50 before center punch 52 contacts the cell. The lower end of the cylindrical wall can be tapered outwardly so that it can receive the upper end of cell 20 and guide it into alignment.

As discussed above, the sequence of steps carried out by die 50 can be reversed. Die 55 and punch 52 can be repositioned relative to each other so that punch 52 is retracted further within die 55 than shown FIG. 7. Thus, as die 55 and punch 52 travel downwardly together die 55 performs the radial crimp first. Punch 52 then contacts cell rim 19 and continues to a fixed stop. Center punch 52 remains in this position as sizing die 55 is retracted, stripping the crimped cell from the die. Once cell 20 is free from sixing die 55 center punch 52 retracts, thus completing the crimp cycle.

Virtually all cylindrical cell sizes can be sealed using the present method. The above description of a preferred embodiment is not intended to limit the present invention as claimed. Other means for practicing the method of the present invention are possible and are within the scope of Applicants' invention.

What is claimed is:

1. An improved method for sealing a cylindrical electrochemical cell having an open ended metal container comprising placing a circular, resilient sealing member in the open end of the container and onto an outwardly directed step near the open end with the top of the sealing member being placed below the upper edge of container; folding the edge of the container inwardly over a peripheral rib of the sealing member and simultaneously compressing said rib between the folded container edge and the container wall and holding said member downwardly onto the step; and reducing the diameter of the stepped portion of the container to the same as that of the remainder of the container whereby the diameter of the sealing member is reduced and said member is compressingly held in place.

2. The method of claim 1 wherein the container edge is folded inwardly by first folding said edge inwardly to an angle of about 90° from the starting position and, in a second folding step, further folding said edge inwardly and downwardly to an angle of greater than 90° from said starting position.

3. The method of claim 1 wherein the diameter of the stepped portion of the container is reduced by applying inwardly directed, radial forces uniformly around said stepped portion.

4. The method of claim 3 comprising first applying the radial forces near the upper end of the container and then moving the application of the forces downwardly until the diameter of the stepped portion is reduced to about the same diameter as the remainder of the container.

5. An improved method for sealing a cylindrical electrochemical cell having an open ended metal container comprising placing a circular, resilient sealing member in the open end of the container and onto an outwardly directed step near the open end with the top of the sealing member being placed below the upper edge of container; folding the edge of the container inwardly over a peripheral rib of the sealing member and to an angle of about 90° from the starting position and holding said sealing member downwardly against the step; reducing the diameter of the stepped portion of the container to the same as that of the remainder of said container whereby the diameter of the sealing member is reduced and said member is compressingly held in place; and further folding the edge of the container inwardly and downwardly to encompass the periphery of the sealing member between the edge of the container and the reduced, stepped portion thereof.

6. An improved method for sealing a cylindrical electrochemical cell having an open ended, metal container comprising placing a circular, resilient sealing and insulating member in the open end of the container and onto an outwardly directed step near the open end with the upper surface of the sealing member being placed below the upper edge of the container; folding container edge inwardly over a peripheral rib in the the sealing member and simultaneously compressing the rib between the folded edge and the stepped container portion and holding the sealing member downwardly against the step; and applying inwardly directed radial forces uniformly around the circumference of the stepped portion of the container to reduce the diameter thereof whereby the diameter of the sealing member is also reduced and said member is compressingly held in place.

7. The method of claim 6 wherein said container edge is folded inwardly over the periphery of the sealing member by first folding the edge inwardly to an angle of about 90° from the starting position followed by bending said rim downwardly to an angle of more than 90° from the starting position.

8. The method of claim 7 comprising impacting a pre-crimping die axially onto said stepped portion to form said 90° fold in a single operation, said die having a cavity for receiving said stepped portion, said cavity having an inwardly tapered wall terminating in a right-angled portion so that when said die is impacted onto said stepped portion said portion enters the cavity and the container edge is gradually folded inwardly until a 90° angle is formed as the stepped portion follows the contour of the cavity.

9. The method of claim 8 comprising bending said edge downwardly to an angle of more than 90° from the starting position by impacting a punch die onto the inwardly folded edge to a fixed-stop position, the impacting surface of said punch die having an annular shaped tip circumscribed by an upwardly and outwardly directed shoulder so that the annular tip engages with the cell edge and bends said edge downwardly and said shoulder shapes a fold in the stepped portion of the cell container to form the rim of said cell.

10. The method of claim 9 comprising applying inwardly directed radial forces to said stepped portion by axially sliding an annular sizing die downwardly over said stepped portion to a point beyond said step while said cell is held down by said punch die, wherein said sizing die comprises in inner bore for receiving and applying radial forces to said cell, said bore comprising an inwardly tapered wall with a diameter at its lowest end large enough to receive said cell and a diameter at its upper end about the same as the diameter of the remainder of the cell container so that as the sizing die slides downwardly over said cell the tapered wall first applies radial forces near the top of said cell and the application of said radial forces moves downwardly as the die moves downwardly until the diameter of the stepped portion is reduced to about the same as the diameter of the remainder of the cell container.

11. The method of claim 10 comprising retracting said sizing die from said cell while said cell is held down by said punch die.

12. The method of claim 11 comprising retracting said punch die to release the crimped cell.

* * * * *